(12) United States Patent
Gratton

(10) Patent No.: US 8,973,038 B2
(45) Date of Patent: Mar. 3, 2015

(54) MISSED CONTENT ACCESS GUIDE

(71) Applicant: EchoStar Technologies, L.L.C., Englewood, CO (US)

(72) Inventor: Max Stephen Gratton, Lakewood, CO (US)

(73) Assignee: Echostar Technologies L.L.C., Englewood, TX (US)

( * ) Notice: Subject to any disclaimer, the term of this patent is extended or adjusted under 35 U.S.C. 154(b) by 100 days.

(21) Appl. No.: 13/886,873

(22) Filed: May 3, 2013

(65) Prior Publication Data

US 2014/0331260 A1  Nov. 6, 2014

(51) Int. Cl.
*H04N 5/445* (2011.01)
*H04N 21/482* (2011.01)
*H04N 21/472* (2011.01)

(52) U.S. Cl.
CPC .......... *H04N 21/482* (2013.01); *H04N 21/472* (2013.01)
USPC ......................................................... 725/40

(58) Field of Classification Search
CPC ................... H04N 21/47217; H04N 21/23406
USPC .......................................................... 725/40
See application file for complete search history.

(56) References Cited

U.S. PATENT DOCUMENTS

| | | | |
|---|---|---|---|
| 6,005,562 A | 12/1999 | Shiga et al. | |
| 6,177,931 B1 | 1/2001 | Alexander et al. | |
| 6,681,396 B1 | 1/2004 | Bates et al. | |
| 7,774,811 B2 * | 8/2010 | Poslinski et al. | 725/45 |
| 7,825,989 B1 | 11/2010 | Greenberg | |
| 7,849,487 B1 | 12/2010 | Vosseller | |
| 8,079,052 B2 | 12/2011 | Chen et al. | |
| 8,104,065 B2 | 1/2012 | Aaby et al. | |
| 8,296,797 B2 | 10/2012 | Olstad et al. | |

(Continued)

FOREIGN PATENT DOCUMENTS

| | | |
|---|---|---|
| EP | 2 309 733 B1 | 4/2011 |
| KR | 2004 0025073 A | 3/2004 |

(Continued)

OTHER PUBLICATIONS

Extended European Search Report for EP 11166892.7 dated Oct. 6, 2011, 7 pages.

(Continued)

*Primary Examiner* — Junior Mendoza
(74) *Attorney, Agent, or Firm* — Kilpatrick Townsend & Stockton LLP

(57) ABSTRACT

Arrangements for providing available playback options for missed portions of broadcast content may be presented. A request to present an electronic programming guide that comprises indications of a plurality of television programs currently being broadcast may be received. A missed portion of each television program of the plurality of television programs may have already been broadcast. For each television program of the plurality of television programs, a plurality of content resources from which the missed portion of each television program of the plurality of television programs may be retrievable may be analyzed. A first source from the plurality of content resources from which the missed portion of a television program is retrievable may be identified. The electronic programming guide may be configured and output to comprise an indication of availability of the missed portion of the television program.

16 Claims, 7 Drawing Sheets

(56) References Cited

U.S. PATENT DOCUMENTS

| | | |
|---|---|---|
| 2001/0013123 A1 | 8/2001 | Freeman et al. |
| 2002/0075402 A1 | 6/2002 | Robson et al. |
| 2002/0178444 A1 | 11/2002 | Trajkovic et al. |
| 2003/0126605 A1 | 7/2003 | Betz et al. |
| 2003/0126606 A1 | 7/2003 | Buczak et al. |
| 2003/0188317 A1 | 10/2003 | Liew et al. |
| 2003/0208763 A1* | 11/2003 | McElhatten et al. ............ 725/58 |
| 2005/0071865 A1 | 3/2005 | Martins |
| 2005/0125302 A1 | 6/2005 | Brown et al. |
| 2005/0166230 A1* | 7/2005 | Gaydou et al. ................. 725/41 |
| 2005/0240961 A1 | 10/2005 | Jerding et al. |
| 2006/0020962 A1 | 1/2006 | Stark et al. |
| 2006/0174277 A1 | 8/2006 | Sezan et al. |
| 2006/0238656 A1 | 10/2006 | Chen et al. |
| 2006/0282869 A1* | 12/2006 | Plourde, Jr. ................... 725/115 |
| 2007/0033616 A1 | 2/2007 | Gutta |
| 2007/0083901 A1* | 4/2007 | Bond .............................. 725/94 |
| 2007/0127894 A1 | 6/2007 | Ando et al. |
| 2007/0146554 A1 | 6/2007 | Strickland et al. |
| 2007/0154169 A1 | 7/2007 | Cordray et al. |
| 2007/0157249 A1 | 7/2007 | Cordray et al. |
| 2007/0226766 A1* | 9/2007 | Poslinski et al. ................ 725/89 |
| 2007/0245379 A1 | 10/2007 | Agnihortri |
| 2008/0097949 A1 | 4/2008 | Kelly et al. |
| 2008/0109307 A1 | 5/2008 | Ullah |
| 2008/0195457 A1 | 8/2008 | Sherman et al. |
| 2008/0235348 A1 | 9/2008 | Dasgupta |
| 2008/0300982 A1 | 12/2008 | Larson et al. |
| 2008/0320523 A1* | 12/2008 | Morris et al. .................. 725/47 |
| 2009/0055385 A1 | 2/2009 | Jeon et al. |
| 2009/0234828 A1 | 9/2009 | Tu |
| 2009/0299824 A1 | 12/2009 | Barnes, Jr. |
| 2010/0166389 A1 | 7/2010 | Knee et al. |
| 2010/0251295 A1 | 9/2010 | Amento et al. |
| 2010/0262986 A1 | 10/2010 | Adimatyam et al. |
| 2010/0269144 A1 | 10/2010 | Forsman et al. |
| 2010/0319019 A1 | 12/2010 | Zazza |
| 2011/0072448 A1 | 3/2011 | Stiers et al. |
| 2011/0109801 A1 | 5/2011 | Thomas et al. |
| 2011/0239249 A1 | 9/2011 | Murison et al. |
| 2011/0286721 A1* | 11/2011 | Craner ........................ 386/343 |
| 2012/0060178 A1 | 3/2012 | Minakuchi et al. |
| 2012/0106932 A1 | 5/2012 | Grevers, Jr. |
| 2012/0131613 A1* | 5/2012 | Ellis et al. ....................... 725/39 |
| 2012/0185895 A1 | 7/2012 | Wong et al. |
| 2012/0230651 A1 | 9/2012 | Chen |
| 2012/0246672 A1 | 9/2012 | Sridhar et al. |
| 2012/0311633 A1 | 12/2012 | Mandrekar et al. |
| 2013/0014159 A1 | 1/2013 | Wiser et al. |
| 2013/0174196 A1 | 7/2013 | Herlein |
| 2014/0068675 A1 | 3/2014 | Mountain |
| 2014/0123160 A1 | 5/2014 | van Coppenolle et al. |
| 2014/0282714 A1 | 9/2014 | Hussain |
| 2014/0373079 A1 | 12/2014 | Friedrich et al. |

FOREIGN PATENT DOCUMENTS

| | | |
|---|---|---|
| KR | 2006 0128295 A | 12/2006 |
| WO | 98/37694 A1 | 8/1998 |
| WO | 2007/064987 A2 | 6/2007 |
| WO | 2007/098067 A1 | 8/2007 |
| WO | 2009/073925 A1 | 6/2009 |

OTHER PUBLICATIONS

Extended European Search Report for EP 14160140.1 received Jul. 7, 2014, 7 pages.

U.S. Appl. No. 13/942,451, filed Jul. 15, 2013 Non Final Office Action mailed Jul. 28, 2014, 27 pages.

U.S. Appl. No. 13/919,702, filed Jun. 17, 2013 Non Final Office Action mailed Jun. 11, 2014, 25 pages.

International Search Report and Written Opinion of PCT/US2014/033796 mailed Sep. 5, 2014, 12 pages.

U.S. Appl. No. 14/200,864, filed Mar. 7, 2014, Non-Final Office Action mailed Dec. 5, 2014, 35 pages.

U.S. Appl. No. 14/095,860, filed Dec. 3, 2013 Non-Final Office Action mailed Dec. 26, 2014, 45 pages.

U.S. Appl. No. 13/919,702 filed Jun. 17, 2013 Final Office Action mailed Nov. 18, 2014, 24 pages.

U.S. Appl. No. 13/971,579 filed Aug. 20, 2013 Non Final Office Action mailed Oct. 28, 2014, 35 pages.

* cited by examiner

MISSED CONTENT ACCESS GUIDE

BACKGROUND

Television users have more options than ever to view content. In addition to live broadcasts of content and local recordings of content (e.g., using a digital video recorder), content may be accessible from various sources via a network (e.g., the Internet). Many television viewers may tune in to watch a broadcast of a television program while the television program's broadcast is already in progress. As such, the television user may have to cope with missing a portion of the television program. However, various sources may be available for the user to access the missed content. Access to such various sources may be confusing and overwhelming to many users. Further, access to such sources may be disjunct. As such, such sources may remain unused by many users and the television user may, unfortunately, never view the missed content despite its availability.

SUMMARY

Various arrangements for providing playback options for missed portions of broadcast content are provided. In some embodiments, a television receiver system for providing available playback options for missed portions of broadcast content is provided. The television receiver system may include one or more processors. The television receiver system may include a memory communicatively coupled with and readable by the one or more processors and having stored therein processor-readable instructions. When executed by the one or more processors, the instructions may cause the one or more processors to process a received request to present an electronic programming guide that comprises indications of a plurality of television programs currently being broadcast. When the received request to present the electronic programming guide is processed, a missed portion of one or more television programs of the plurality of television programs has already been broadcast. The instructions may cause the one or more processors to, for each missed portion of the one or more television programs of the plurality of television programs, analyze a plurality of content resources from which the missed portion of each television program is potentially retrievable. The instructions may cause the one or more processors to, for a television program of the one or more television programs, identify a first source from the plurality of content resources from which the missed portion of the television program is retrievable. The instructions may cause the one or more processors to configure the electronic programming guide to comprise an indication of availability of the missed portion of the television program. The instructions may cause the one or more processors to output the electronic programming guide for display such that the indication of availability of the missed portion of the television program is indicated.

Embodiments of such a television receiver may include one or more of the following: The indication of availability of the missed portion of the television program may include a progress bar that indicates a time within a total play time of the television program and a color of the progress bar indicates the availability of the missed portion of the television program. The instructions may cause the one or more processors to select a state for the progress bar, wherein the state for the progress bar is based on the availability of the missed portion of the television program and the state is selected from at least three states. The states may include a first state associated with a first color, wherein the first state is indicative of the missed portion of the television program not being available. The states may include a second state associated with a second color, wherein the second state is indicative of the missed portion of the television program being locally stored by the television receiver system. The states may include a third state associated with a third color, wherein the third state is indicative of the missed portion of the television program being remotely available to the television receiver system. The indication of availability of the missed portion of the television program may include an icon that indicates the first source from the plurality of content resources.

Embodiments of such a television receiver may additionally or alternatively include one or more of the following: The indication of availability of the missed portion of the television program may include multiple icons, each icon indicative of a different source from the plurality of content resources through which the missed portion of the television program is available. The instructions may cause the one or more processors to receive and store user credentials from a user of the television receiver system, wherein the user credentials are necessary to access the first source from the plurality of content resources. The instructions may cause the one or more processors to provide the user credentials to the first source. The processor-readable instructions which, when executed by the one or more processors, cause the one or more processors to, for the television program of the plurality of television programs, identify the first source from the plurality of content resources from which the missed portion of the television program is retrievable, may further cause the one or more processors to, for the television program of the plurality of television programs, identify a second source from the plurality of content resources from which the missed portion of the television program is retrievable, wherein the first source and the second source are remote from the television receiver system. The instructions may cause the one or more processors to process a selection of the television program, wherein the selection is based on user input. The instructions may cause the one or more processors to determine, at least partially based on a faster response time, to select the first source instead of the second source to retrieve the missed portion of the television program. The instructions may cause the one or more processors to retrieve at least the missed portion of the television program from the first source. Each television program of the plurality of television programs may be presented in the electronic programming guide with a showcard specific to the corresponding television program. The television receiver system may be a set top box.

In some embodiments, a method for providing available playback options for missed portions of broadcast content is presented. The method may include receiving, by a television receiver, a request to present an electronic programming guide that comprises indications of a plurality of television programs currently being broadcast. When the received request to present the electronic programming guide is processed, a missed portion of one or more television programs of the plurality of television programs may have already been broadcast. The method may include, for each missed portion of the one or more television programs of the plurality of television programs, analyzing, by the television receiver, a plurality of content resources from which the missed portion of the television program is potentially retrievable. The method may include, for a television program of the one or more television programs, identifying, by the television receiver, a first source from the plurality of content resources from which the missed portion of the television program is retrievable. The method may include, configuring, by the television receiver, the electronic programming guide to comprise an indication of availability of the missed portion of the television program. The method may include, outputting, by the television receiver, the electronic programming guide for display such that the indication of availability of the missed portion of the television program is indicated.

Embodiments of such a method may include one or more of the following: The indication of availability of the missed portion of the television program may include a progress bar that indicates a time within a total play time of the television program and a color of the progress bar indicates the availability of the missed portion of the television program. The method may include selecting, by the television receiver, a state for the progress bar, wherein the state for the progress bar is based on the availability of the missed portion of the television program and the state is selected from at least three states. A first state may be associated with a first color, wherein the first state is indicative of the missed portion of the television program not being available. A second state may be associated with a second color, wherein the second state is indicative of the missed portion of the television program being locally stored by the television receiver. A third state may be associated with a third color, wherein the third state is indicative of the missed portion of the television program being remotely available to the television receiver. The indication of availability of the missed portion of the television program may include an icon that indicates the first source from the plurality of content resources. The indication of availability of the missed portion of the television program may include multiple icons, each icon indicative of a different source from the plurality of content resources through which the missed portion of the television program is available.

Embodiments of such a method may additionally or alternatively include one or more of the following: The method may include receiving and storing, by the television receiver, user credentials, wherein the user credentials are necessary to access the first source from the plurality of content resources. The method may include providing, by the television receiver, the user credentials to the first source. Identifying the first source from the plurality of content resources from which the missed portion of the television program is retrievable, may include identifying, by the television receiver, a second source from the plurality of content resources from which the missed portion of the television program is retrievable. The first source and the second source may be remote from the television receiver. The method may include processing, by the television receiver, a selection of the television program, wherein the selection is based on user input. The method may include determining, by the television receiver, at least partially based on a faster response time, to select the first source instead of the second source to retrieve the missed portion of the television program. The method may include retrieving, by the television receiver, at least the missed portion of the television program from the first source. Each television program of the plurality of television programs may be presented in the electronic programming guide with a showcard specific to the corresponding television program.

In some embodiments, a non-transitory processor-readable medium for providing available playback options for missed portions of broadcast content is presented. The processor-readable instructions may be configured to cause one or more processors to process a received request to present an electronic programming guide that comprises indications of a plurality of television programs currently being broadcast. When the received request to present the electronic programming guide is processed, a missed portion for at least one of the plurality of television programs may have already been broadcast. The instructions may be configured to cause the one or more processors to, for each of the missed portions of the plurality of television programs, analyze a plurality of content resources from which the missed portion of each television program of the plurality of television programs is potentially retrievable. The instructions may be configured to cause the one or more processors to, for a television program of the plurality of television programs, identify a first source from the plurality of content resources from which the missed portion of the television program is retrievable. The instructions may be configured to cause the one or more processors to configure the electronic programming guide to comprise an indication of availability of the missed portion of the television program. The instructions may be configured to cause the one or more processors to output the electronic programming guide for display such that the indication of availability of the missed portion of the television program is indicated.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
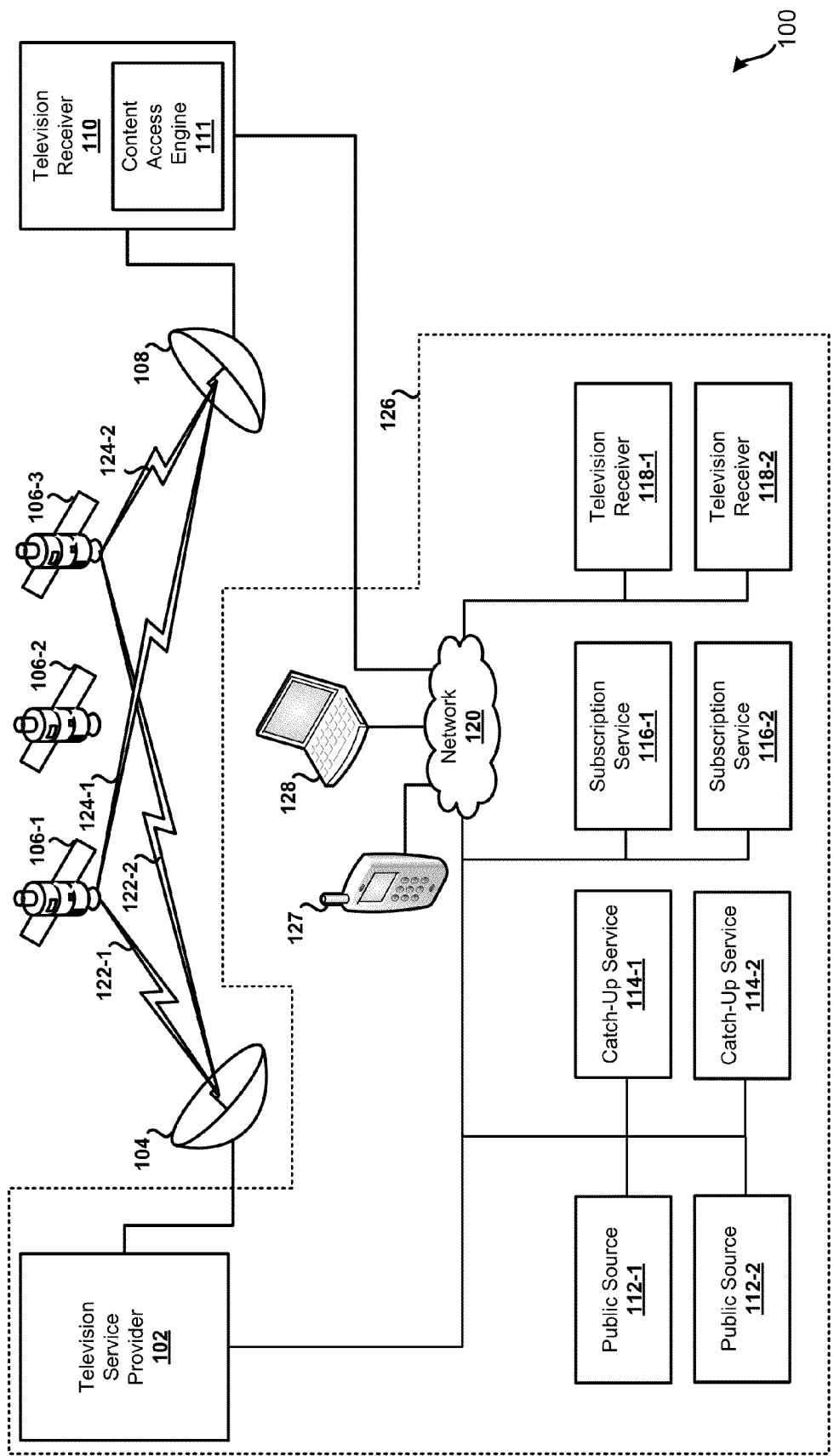
FIG. 1 illustrates an embodiment of a television program distribution system.

A user may have access to many sources of content (e.g., television programs) from which the content can be retrieved when desired for presentation. At least some of these sources of content may be used to augment the viewing of broadcast television programming. A broadcast television program can refer to a television program that is distributed on a television channel according to a predefined schedule. For example, a broadcast television program may be scheduled to be broadcast from 8:00 PM until 8:30 PM on a particular date on a particular channel. If a user tunes in late to the broadcast television program (e.g., at 8:10 in the previous example), the user may desire to view the missed portion of the television program by utilizing a source of content other than the broadcast provided by a television service provider.

In response to user input, an electronic programming guide (EPG) may be presented by a television receiver via a display device (e.g., television, monitor) that indicates to the user which television programs are currently being broadcast on various television channels. To augment this information, the EPG may also present indications of how much of the broadcast of the television programs has elapsed. Further, the EPG may present indications to the user of whether and/or what source(s) may be used to obtain a missed portion of a television program for viewing. These indications within the EPG may be combined for presentation. For instance, in some embodiments, a status bar may be presented for each television program. The status bar may contain a graphical element that is indicative of the amount of the broadcast of the television program that has elapsed. The status bar may also have an attribute, such as color, that is indicative of whether a source is available to retrieve a missed portion of the broadcast program. For example, a first color, such as red or black, may indicate that no source is available from which a missed portion of the television program may be retrieved. If a source from which the missed portion of the broadcast television program can be retrieved is available, color, or some other attribute, of the status bar (or other portion of the television program's EPG entry) may indicate properties of the source. For example, a color, such as green, indicative of a first state may indicate that the missed portion of the broadcast television program has been recorded locally by a television receiver (e.g., a set top box, components integrated into a display device). Another color, such as yellow, indicative of a second state may indicate that the television receiver has determined that the missed portion of the television program is available from some remote source, such as a "catch-up" service, public website, subscription service, the television service provider, a television media stream device, or some other source. If multiple sources are available from which a missed portion of the content may be retrieved, graphical elements (e.g., icons) may be used to indicate which sources are available. A source may be selected by the television receiver as a default or based on evaluation criteria. This selected source may be modified by the user. Further, in some embodiments, display characteristics of a television program in the EPG, such as a display order of graphical elements indicative of content resources or color, may indicate the transfer speed or display resolution that is available for a portion of a television program from the content resource.

The EPG may be rendered by the television receiver such that multiple television programs that are currently being broadcast are indicated. Each of these television programs may include a status (e.g., in the form of a status bar) that indicates how much of the scheduled broadcast of each television program has elapsed, whether a missed portion of the broadcast of the television program can be retrieved, and/or what sources are available from which the television program may be retrieved. Upon selection of a television program, the user may be prompted with a query as to whether the user wants to watch a missed portion of the television program (if available) or join the broadcast in progress. If the user elects to watch the missed portion of the television program, the remainder of the scheduled broadcast of the television program may be recorded by the television receiver using digital video recorder (DVR) functionality. The missed portion of the television program may be retrieved by the television receiver according a schedule of priorities. A locally-recorded copy of the missed portion of the television program may be given the highest priority. For remote sources, if multiple sources for the missed portion of the television program are available, each source may be pinged for a response time and/or to determine a transfer rate. The source with the best determined characteristics (e.g., response time, transfer rate) may be used for retrieving the missed portion of the television program. In some embodiments, the user may provide an indication of preferences for a priority of retrieval sources.

FIG. 1 illustrates an embodiment of a television program distribution system 100. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

System 100 may include television service provider 102, satellite uplink 104, a plurality of orbiting (e.g., geosynchronous) satellites 106a-c, satellite receiver 108, television receiver 110, one or more public sources 112, one or more catch-up services 114, one or more subscription services 116, one or more (other) television receivers 118, mobile device 127, and computer system 128. Television receiver 110 may at least include a content access engine 111. The content access engine 111 may in one aspect be configured to access multiple local and/or remote content resources.

System 100 may include at least one network 120 that can be used for a bidirectional communication path for data transfer with television receiver 110 and other components of system 100. Network 120 is intended to represent any number of terrestrial and/or non-terrestrial networks and/or network features. For example, network 120 may incorporate or exhibit any number of features or elements of various wireless and/or hardwired packet-based communication networks such as, for example, a WAN (Wide Area Network) network (e.g., the Internet), a HAN (Home Area Network) network, a LAN (Local Area Network) network (e.g., a corporate LAN), a WLAN (Wireless Local Area Network) network, a cellular communications network, and/or any other type of communication network(s) configured such that data may be transferred between and among respective elements of the example system 100.

Television receiver 110, as described throughout, may generally be any type of television receiver, such as an STB (set-top box) for example. In another example, television receiver 110 (and other remote television receivers, such as television receivers 118) may be integrated as part of or into a television, a DVR, a computing device, such as a tablet computing device, or any other computing system or device, as well as variations thereof. In some embodiments, television receiver 110 may be a component that is added into a display device, such as in the form of an expansion card. Television receiver 110 and network 120 together with television receivers 118, mobile device 127, and/or computer system 128, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc.

In some embodiments, broadcast television programs may be delivered to television receivers, including television receiver 110, via satellite according to a schedule. On-demand content may also be delivered to television receiver 110 via satellite. Satellites 106 may be configured to receive uplink signals 122 from satellite uplink 104. In this example, uplink signals 122 may contain one or more transponder streams of particular data or content, such as particular television channels, each of which may be supplied by television service provider 102. For example, each of uplink signals 122 may contain various media content such as HD (High Definition) television channels, SD (Standard Definition) television channels, on-demand programming, programming information (e.g., table data), and/or any other content in the form of at least one transponder stream, and in accordance with an allotted carrier frequency and bandwidth. In this example, different media content may be carried using different satellites of satellites 106. Further, different media content may be carried using different transponders of a particular satellite (e.g., satellite 106-1); thus, such media content may be transmitted at different frequencies and/or different frequency ranges. For example, a first and second television channel may be carried on a first carrier frequency over a first transponder (as part of a single transponder stream) of satellite 106-1, and a third, fourth, and fifth television channel may be carried on a second carrier frequency (as part of another transponder stream) over a transponder of satellite 106-3, or, the third, fourth, and fifth television channel may be carried on a second carrier frequency over a second transponder of satellite 106-1, etc.

Satellites 106 may further be configured to relay uplink signals 122 to satellite receiver 108 as downlink signals 124. Similar to the uplink signals 122, each of the downlink signals 124 may contain one or more transponder streams of particular data or content, such as various encoded and/or at least partially scrambled television channels, on-demand programming, etc., in accordance with an allotted carrier frequency and bandwidth.

Satellite receiver 108, which may include a satellite dish, a low noise block (LNB), and/or other components, may be provided for use to receive television channels, such as on a subscription basis, distributed by television service provider 102 via satellites 106. For example, satellite receiver 108 may be configured to receive particular transponder streams as downlink signals 124, from one or more of the satellites 106. Based on the characteristics of television receiver 110 and/or satellite receiver 108, it may only be possible to capture transponder streams from a limited number of transponders of satellites 106 concurrently. For example, a tuner of television receiver 110 may only be able to tune to a single transponder stream from a transponder of a single satellite, such as satellite 106-1, at a time.

Television receiver 110, which may be communicatively coupled to the satellite receiver 108, may subsequently select, via a tuner, decode, and relay television programming to a television for display thereon. Broadcast television programming or content may be presented "live," or from a recording as previously stored on, by, or at television receiver 110. For example, an HD channel may be output to a television by television receiver 110 in accordance with the HDMI/HDCP content protection technologies. Other embodiments are possible. For example, in some embodiments, an HD channel may be output to a television in accordance with the MoCA® (Multimedia over Coax Alliance) home entertainment networking standard. Other embodiments are possible.

Television receiver 110 may select via tuner, decode, and relay particular transponder streams to one or both of television receivers 118, which may in turn relay particular transponder streams to display devices. For example, satellite receiver 108 and television receiver 110 may, respectively, be configured to receive, decode, and relay at least one television channel to a television by way of television receiver 118-2. Similar to the above-example, a television channel may generally be presented "live," or from a recording as previously stored by television receiver 110, and may be output to a display device by way of television receiver 118-1 in accordance with a particular content protection technology and/or networking standard. Other embodiments are possible.

Content resources 126 may be used to provide television receiver 110 with content (e.g. television programming). Content resources 126 may be used to retrieve television programs or portions of television programs following and/or during a live broadcast of the television programs. Content resources 126 may include television service provider 102, public sources 112, catch-up services 114, subscription services 116, and television receivers 118. Other forms of content resources are further detailed below.

Television service provider 102, which may distribute broadcast television programming to television receiver 110 via a satellite-based television programming distribution arrangement (or some other form of television programming distribution arrangement, such as a cable-based network or IP-based network, may use an alternate communication path, such as via network 120, to provide television programming to television receiver 110. Television receiver 110 may be permitted to request various television programs or portions of television programs from television service provider 102 via network 120. For instance, television service provider 102 may be permitted to transmit a portion of a television program or an entire television program during and/or after a time at which the television program was broadcast live by the television service provider via a satellite-based television programming distribution arrangement. In some embodiments, the television service provider may only be permitted to distribute a portion of the television program during the live broadcast of the television program. As such, once the broadcast of the television program has completed via the satellite-based television programming distribution arrangement, the ability for television receiver 110 to request streaming of at least the portion of the television program may be, at least temporarily, lost. Whether at least a portion of a television program is permitted to be transmitted to television receiver 110 via network 120 by television service provider 102 may be based on a subscription with television service provider 102 held by a user of television receiver 110 and/or with contractual arrangements between television service provider 102 and the producers of the television program and/or the television channel on which the television program is broadcast.

In some embodiments, television service provider 102 may provide a staggered television program distribution service via the satellite-based (or other form of) television programming distribution arrangement. A television program that is distributed on a first television channel starting at a given time may also be distributed via a second, staggered television channel, transponder, and/or satellite starting at a later time. As such, if a television program begins at 8:00 PM, via the staggered television program distribution service, the same television program may be broadcast beginning at 8:15 PM. As such, such a staggered service may be used by television receiver 110 to retrieve a "missed" portion of a television program.

In some embodiments, television service provider 102 may provide the television program of which television receiver 110 is to receive a portion via on-demand content. On-demand content may be included in a user's subscription or may be provided on a per-request basis. Such on-demand content may be provided via the satellite-based distribution arrangement and/or via network 120. If the on-demand version of the television program requires payment of a fee, before providing the television program to television receiver 110, a user of television receiver 110 may at least need to agree to payment of the fee. On-demand content provided via the satellite-based distribution arrangement may be stored locally by television receiver 110 to allow on-demand access. On-demand content may also be retrieved via network 120 from television service provider 102.

Mobile device 127 and computer system 128 represent computerized devices associated with a user of television receiver 110. Mobile device 127 may be a cellular phone, tablet computer, or other form of computerized device. Computer system 128 may represent a laptop computer, desktop computer, home server, or other form of computerized device. Television receiver 110 may be provided with access credentials that allow access to content stored and/or accessible through mobile device 127 and/or computer system 128. It should be understood that mobile device 127 and computer system 128 are exemplary in nature. Content may be accessible through a fewer or greater number of computerized devices associated with a user of television receiver 110.

Public sources 112 represent content resources through which television programs may be retrieved by television receiver 110 via network 120. Television programming available through public sources 112 may be available for free and not require subscription (a username and/or password may or may not be necessary). Each of public sources 112 may represent different websites available via the Internet. For example, some television programming may be legally made available for free (such as television programming provided by government-funded sources, e.g., the BBC or Hulu®). Periodically, television receiver 110 may poll public sources 112 to determine which television programs are available and/or which television programs are scheduled to be available in the future. In some embodiments, television receiver 110 may poll public sources 112 regarding the availability of at least a portion of a specific television program. While two examples of public sources 112 are illustrated, it should be understood that television receiver 110 may have access to more or fewer public sources 112.

Catch-up services 114 represent content resources through which television programs may be retrieved by television receiver 110 via network 120. Television programming available through public sources 112 may be available for free and not require subscription (a username and/or password may or may not be necessary). Some catch-up services may require a subscription and may require user authentication. Catch-up services 114 may only make a television program available during the live broadcast of the television program. For example, a catch-up service authorized or run by a television channel (e.g., NBC) or television program production company may make at least a portion of a television program available for streaming or download during a live broadcast scheduled time slot. Therefore, a user may be permitted to watch a missed portion of a live broadcast television program via a catch-up service, but may not be permitted to view the entire television program via the catch-up service at a later time. In some embodiments, television programs may be available via a catch-up service for up to a fixed period of time after the live broadcast of the television program or indefinitely (e.g., until the catch-up service provider decides to remove accessibility to the television program). Periodically, television receiver 110 may poll catch-up services 114 to determine which television programs are available and/or which television programs are scheduled to be available in the future. In some embodiments, television receiver 110 may poll catch-up services 114 regarding the availability of at least a portion of a specific television program. While two examples of catch-up services 114 are illustrated, it should be understood that television receiver 110 may have access to more or fewer catch-up services 114.

Subscription services 116 represent content resources through which television programs may be retrieved by television receiver 110 via network 120. Television programming available through subscription services 116 may require a paid subscription and may require a username and/or password be provided. Each of subscription services 116 may represent different websites available via the Internet. For example, some television programming may be legally made available via a service operated by a television channel or authorized agent of the television channel or television program production company. Periodically, television receiver 110 may poll subscription services 116 to determine which television programs are available and/or which television programs are scheduled to be available in the future. In some embodiments, television receiver 110 may poll subscription services 116 regarding the availability of at least a portion of a specific television program. While two examples of subscription services 116 are illustrated, it should be understood that television receiver 110 may have access to more or fewer subscription services 116.

Television receiver 110 may be able to retrieve at least a portion of a television program through other television receivers 118, which can function as content resources. For instance, a Slingbox® (or other form of media streaming device) functioning in concert with a television receiver may permit television programs to be captured and streamed over network 120. In some embodiments, television receivers 118 may have such media streaming capabilities integrated. A user may be able to obtain at least a portion of a television program via television receivers 118, which may be associated with other users or with the same user. For instance, the user may have multiple television receivers at different locations. Periodically, television receiver 110 may poll television receivers 118 to determine which television programs are available and/or which television programs are scheduled to be available in the future. In some embodiments, television receiver 110 may poll television receivers 118 regarding the availability of at least a portion of a specific television program. While two examples of television receivers 118 are illustrated, it should be understood that television receiver 110 may have access to more or fewer television receivers 118.

Figure 2:
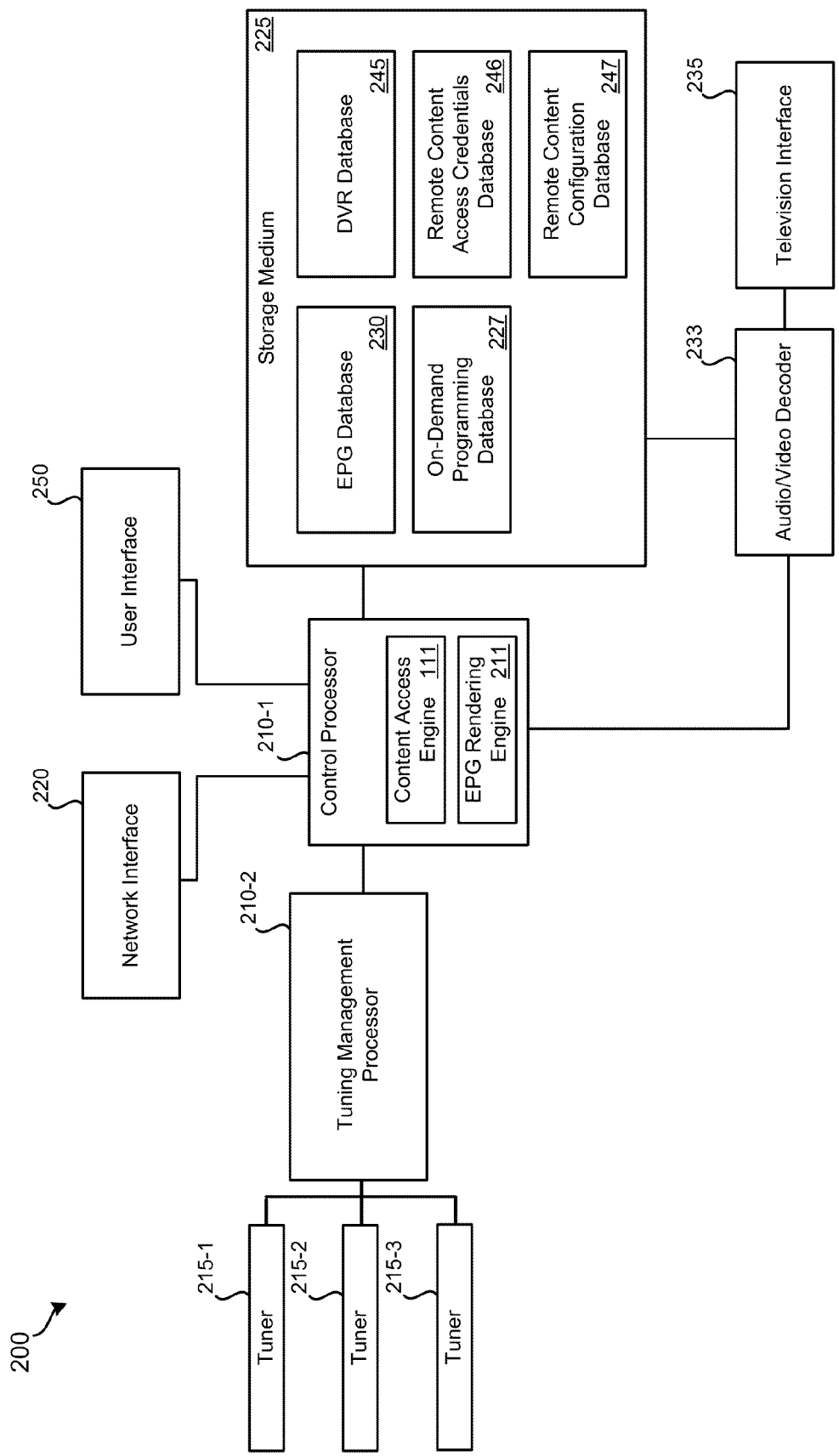
FIG. 2 illustrates an embodiment of a television receiver.

FIG. 2 illustrates an embodiment of television receiver 200, which may typically be in the form of a separate device configured to be connected with a presentation device, such as a television. Embodiments of television receiver 200 may include set top boxes (STBs). As previously noted, in addition to being in the form of an STB, a television receiver may be incorporated into another device, such as a television. For example, a television may have an integrated television receiver (which does not involve an external STB being coupled with the television). An STB may contain some or all of the components of television receiver 200 and/or may be able to perform some or all of the functions of television receiver 200. Accordingly, instances in this document referring to an STB and steps being performed by an STB may also be performed, more generally, by a television receiver.

FIG. 2 illustrates a block diagram of an embodiment of television receiver 200 that is configured to record omnibus channel files and extract a television program from a recorded omnibus channel file. Television receiver 200 may represent the television receiver of FIG. 1 and may be in the form of an STB that communicates with a display device such as a television or monitor. Television receiver 200 may be incorporated as part of a television. Television receiver 200 may include: processors 210 (which may include control processor 210-1 and tuning management processor 210-2), tuners 215, network interface 220, non-transitory computer-readable storage medium 225, electronic programming guide (EPG) database 230, television interface 235, digital video recorder (DVR) database 245, on-demand programming 227, user interface 250, audio/video decoder 233, remote content access credentials database 246 and/or remote content configuration database 247. In other embodiments of television receiver 200, fewer or greater numbers of components may be present. It should be understood that the various components of television receiver 200 may be implemented using hardware, firmware, software, and/or some combination thereof. Functionality of components may be combined.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors.

Control processor 210-1 may communicate with tuning management processor 210-2. Control processor 210-1 may control the recording of television channels based on timers stored in DVR database 245. Control processor 210-1 may initiate recording of a television channel by sending a record command along with an indication of the television channel to be recorded to tuning management processor 210-2. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to audio/video decoder 233 for output to a presentation device, such as a television.

Control processor 210-1 may also communicate with network interface 220 and user interface 250. Control processor 210-1 may handle incoming data from network interface 220 and user interface 250. Additionally, control processor 210-1 may be configured to output data via network interface 220.

Tuners 215 may include one or more tuners used to tune to television channels, such as television channels transmitted via satellite or cable. In the illustrated embodiment of television receiver 200, three tuners are present (tuner 215-1, tuner 215-2, and tuner 215-3). Each tuner contained in tuners 215 may be capable of receiving and processing a single stream of data from a satellite transponder (or a cable RF channel) at a given time. As such, a single tuner may tune to a single transponder (or, for a cable network, a single cable RF channel). If tuners 215 include multiple tuners, one tuner may be used to tune to a television channel on a first transponder stream for display using a television, while another tuner may be used to tune to a television channel on a second transponder for recording and viewing at some other time. Still another tuner may be used to check various television channels to determine if they are available or not. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be used for tuning.

Network interface 220 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, television receiver 110 may be able to communicate with television service provider 102 via a network, such as the Internet. This communication may be bidirectional: data may be transmitted from television receiver 110 to television service provider 102 and from television service provider 102 to television receiver 110. Referring back to FIG. 2, network interface 220 may be configured to communicate via one or more networks, such as the Internet, to communicate with television service provider 102 of FIG. 1. Information may be transmitted and/or received via network interface 220. Network interface 220 may also be used to query and/or receive data from various content resources 126 available to television receiver 110. For example, network interface 220 may be used to retrieve at least portions of television programs from public sources 112, catch-up services 114, subscription services 116, television receivers 118, mobile device 127, and/or computer system 128.

Storage medium 225 may represent a non-transitory computer-readable storage medium. Storage medium 225 may include memory and/or a hard drive. Storage medium 225 may be used to store information received from one or more satellites and/or information received via network interface 220. Storage medium 225 may store information related to EPG database 230, DVR database 245, on-demand programming database 227, remote content access credentials database 246, and/or remote content configuration database 247. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored of television programs recorded due to provider-defined timers.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 106 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously. Data from EPG database 230, which may be used in combination with other information (such as information about which television programs can be retrieved via network interface 220 and/or information about television programs stored in DVR database 245) may be used to present a user with a graphical EPG via a display device, such as a television.

In addition to being used to provide users with information about scheduled programming, information from EPG database 230 may be used to determine when television programs begin and end for the purposes of recording. For instance, if a channel-specific file is recorded that contains multiple television programs, the start and end of time of specific television programs within the channel-specific file may be based on the start and end times indicated in the EPG. Other data may be stored for the EPG that may be useful in managing channel-specific files, such as series identifiers and episode identifiers (which may be used by a television service provider to identify particular television programs).

Audio/video decoder 233 may serve to convert encoded video and audio into a format suitable for output to a display device. For instance, audio/video decoder 233 may receive MPEG video and audio from storage medium 225 to be output to a display device. MPEG video and audio from storage medium 225 may have been recorded to DVR database 245 as part of a previously-recorded television program. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 227 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

The DVR functionality of control processor 210-1 may have multiple modes. First, the DVR functionality of control processor 210-1 may be configured to record individual television programs selected by a user. Such user-defined television programming may be recorded based on user-defined timers. Each user-defined timer is set by a user and specifies a date, television channel, and a time period for recording. To create a user-defined timer, a user may select a particular television program via a graphically-displayed EPG. Based on the date, time period, and television channel indicated by EPG database 230, control processor 210-1 may record the associated television program to a user-managed television programming storage portion of DVR database 245.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to system 100 of FIG. 1, in a satellite-based television service provider system, data necessary to create the provider-defined timers at television receiver 110 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. Television programming recorded based on provider-defined timers may be stored to a provider-managed television programming storage portion of DVR database 245.

On-demand programming 227 may represent additional television programming stored by storage medium 225. On-demand programming 227 may include television programming that was not recorded to storage medium 225 via a timer (either user- or provider-defined). Rather, on-demand programming is programming provided to the television receiver directly for storage by the television receiver and for later presentation to one or more users. In some systems, such as cable and IP-based television distribution networks, on-demand content is requested by a television receiver and retrieved from a remote server in response to a user requesting the on-demand content. In other systems, such as systems in which bandwidth is at a premium and/or communication to the television receiver is one-way (e.g., satellite-based television distribution networks), on-demand content may be pre-loaded to a television receiver for the possibility of a user requesting the on-demand content. On-demand content may be "free" (e.g., included in the cost of a user's subscription with the television service provider) or may be pay-per-view (e.g., a movie that costs an amount of money to be viewed). On-demand programming database 227 may not be user-selected. As such, the television programming stored to on-demand programming database 227 may be the same for each television receiver of a television service provider. In some embodiments, programming stored to on-demand programming database 227 may be standardized based on a manufacturer and/or model of television receiver (e.g., television receivers of the same make and/or model store the same on-demand programming). What on-demand programming and for how long such on-demand programming is retained by the television receiver may be determined based on settings propagated by the television service provider.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1.

Remote content access credentials database 246 may store data, such as usernames and passwords, that permit television receiver 200 to access one or more remote content resources. For example, referring to FIG. 1, a username and password (or other form of credentials) may be required for television receiver 110 to access subscription services 116 or another content resource of content resources 126. A user may be permitted to provide and/or update credentials to television receiver 200 that are stored using remote content access credentials database 246.

Remote content configuration database 247 may be used to store television service provider preferences and/or user preferences on the access of content resources 126. Remote content configuration database 247 may identify a priority listing of an order in which content resources should be checked and/or in which content should be retrieved from content resources. For instance, if a piece of content is available from multiple sources, the content resource with the higher priority should be used. Table 1 provides an exemplary remote content configuration database 247 that indicates user preferences. It should be understood that at least some of the preferences in remote content configuration database 247 may be specified by the television service provider.

TABLE 1

| Priority Rating | Source Name | Credentials | User Permission Required? |
|---|---|---|---|
| 1 | Local DVR database | None | No |
| 2 | Television Service Provider | None | No |
| 3 | http://catchup.tv | Yes - Stored | No |
| 4 | Joe's Media Grabber - http://128.343.434.39 | Yes - Stored | No |
| 5 | http://subscriptionservice.tv | Yes - Prompt | Yes |
| 6 | http://tvgrabbernet.org | Yes - Stored | Yes |

Table 1 illustrates an exemplary remote content configuration database 247. A priority ranking may be present. The priority ranking may indicate the order in which content resources should be checked and/or in which content should be retrieved from content resources. Content resources may include those as defined in relation to content resources 126. For example, content resources may include a DVR database of the television receiver, the television service provider, one or more catch-up services (e.g., http://catchup.tv), a subscription service (e.g., http://subscriptionservice.tv), another television receiver or content recording device (e.g., Joe's Media Grabber), etc. Any access credentials required may be stored, such as by remote content access credentials database 246 or may be prompted from the user when access is attempted. Some sources may require specific user permission to proceed. For example, specific user permission may be required when the user is going to be billed for access to a service. It should be understood that table 1 is exemplary—a remote content configuration database 247 may include greater, fewer, and/or different fields. While a user may specify content resources, a television service provider (which may have a contract with one or more content resources) may add content resources to a television receiver's remote content configuration database 247.

Control processor 210-1 may have an EPG rending engine 211 that may be configured to cause an EPG to be output that is based on data from EPG database 230 and information about the availability of at least portions of television programs via content resources indicated in remote content configuration database 247. For instance, control processor 210-1 may control presentation attributes of each television program indicated in a presented EPG, such as a status bar and presentation color. Control processor 210-1 may have a content access engine 111 that is configured to query and retrieve content from content resources via network interface 220 in accordance with data in remote content access credentials database 246 and remote content configuration database 247.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Also, while television receiver 200 may be used to receive, store, and present television channels received via a satellite, it should be understood that similar components may be used to receive, store, and present television channels via a cable network.

Figure 3:
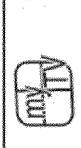
FIG. 3 illustrates an embodiment of an electronic programming guide (EPG) that indicates missed television program content availability.

FIG. 3 illustrates an embodiment 300 of an EPG that indicates missed television program content availability. The EPG is presented by a display device 302, which may be a television. The EPG is output for display by a television receiver, such as television receiver 200 of FIG. 2 and television receiver 110 of FIG. 1. In embodiment 300, an EPG is being presented at 6:22 PM, possibly in response to a user request for the EPG. The EPG displays multiple television programs on multiple television channels, including television programs currently in-progress. The EPG may be presented as a scheduling table, with columns based on time and rows based on television channels. Other variations are possible.

Some of the television programs that are currently in progress may include television programs which began at 6 PM or earlier. For example, in illustrated embodiment 300, television program 310 runs from 6 PM until 6:30 PM; while television program 314 started earlier than 6 PM, such as at 5:30 PM. For some or all television programs currently in progress that are displayed by the EPG, a graphical element may be presented that indicates how much of the broadcast of the television program has elapsed. The determination of how much of the television program being broadcast has elapsed may be based on scheduling data previously transmitted to the television receiver and stored using an EPG database and the current time.

In some embodiments, the graphical element that indicates the amount of progress through each television program is a progress bar. The progress bar may be adjusted in length to fit within the displayed entry for the television program within the displayed EPG. For example, television program 314 may have begun earlier than 6 PM, but because the EPG is displayed beginning at 6 PM, the length of the progress bar for television program 314 may be adjusted to fit within the displayed EPG entry for television program 314. Within each progress bar, an indicator may be present which indicates the amount of progress through the television program. For example, a progress bar may be partially filled to indicate how much of the television program has elapsed. Zero fill indicates the television program has not begun or has just begun; 50% fill may indicate that the broadcast of the television program is halfway complete. The program bar for television program 314 is about 85% full, indicating 85% of the broadcast of the television program has already occurred.

An attribute of the graphical element used to indicate the program through the television program may be used to indicate the availability of at least the portion of the broadcast television program already broadcast. For example, referring to television program 310, at time 6:22 PM, the user may desire to retrieve the earlier missed 22 minutes of the television program. In some embodiments, the color of the filled portion of the status bar for each television program may indicate the availability of retrieval of the portion of the television program. For example, if the progress bar is colored green, this may indicate that the television program has been recorded locally by the television receiver, such as using DVR functionality. If the progress bar is colored yellow, this may indicate that the television program is available to be retrieved via a content resource available across a network. If the progress bar is colored red, this may indicate that the television program is not available to be retrieved.

In order to determine whether a television program is available to be retrieved, the television receiver may query various content resources to determine if the missed portion of the television program is available. In some embodiments, rather than presenting an indication of whether a missed portion of a broadcast television program is available to be retrieved, a user may be required to select the particular television program for one or more content resources to be queried. In some embodiments, rather than querying content resources while the EPG is being displayed or when the EPG is requested by a user, content resources may be queried ahead of time (such as daily) to determine availability ahead of the broadcast of each television program. For instance, a content resource may indicate hours, days, or even weeks ahead of time if a particular scheduled broadcast television program will be made available for access via the content resource during or after the scheduled broadcast.

In illustrated embodiment 300, television program 310, television program 314, and television program 318 each have a progress bar having the same color. In illustrated embodiment 300, this color (represented by a first pattern) indicates that these television programs are available from a remote content resource. The color (represented by a second pattern) of the progress bar for television program 312 indicates that the missed portion of the television program is not available. The color (represented by a third pattern) of the progress bar for television program 316 indicates that this television program has been locally recorded by the television receiver using DVR functionality.

For at least portions of television programs available from multiple content resources, a secondary indicator may be present that indicates the content resources from which the content is available. For example, referring to television program 314, 2 icons are present: icon "A" and icon "V." each of these icons may represent a different content resource. A user may be permitted to select which content resources are used to retrieve the missed portion of television program 314. For instance, if the user desires to watch the missed portion of television program 314, the user may select a particular icon from within the EPG entry for television program 314. In some embodiments, the television receiver may select a content resource as a default based on previously defined priorities, such as priorities stored by remote content configuration database 247 of FIG. 2. In some embodiments, the television receiver may ping each content resource to determine which is responding faster. The faster content resource may be selected by the television receiver. In illustrated embodiment 300, icon "A" for television program 314 is highlighted; this highlighting may indicate that the user has selected the content resource associated with icon "A", the television receiver has selected the content resource associated with icon "A" based on a predefined content resource priority, or the content resource associated with icon "A" is responding faster than the content resource associated with icon "V." In some embodiments, graphical elements other than an icon are used to represent content resources. If only a single content resource is available for a particular television program, no icon may be presented, such as indicated by a television program 310. In other embodiments, if only a single content resource is available for a particular television program in icon indicative of the content resource may be presented, such as for television program 318.

In some embodiments, it may be possible to view indications for television programs that have yet to begin being broadcast that indicate whether or not the television program will be available via one or more content resources. Further, in some embodiments, it may be possible to view a listing of television programs previously completely broadcast (e.g., not in progress). This listing of television programs may indicate whether the television program can be fully retrieved (e.g., not just a portion) from one or more content resources. In some embodiments, while a portion of a television program may be retrieved from a content resource while the television program is being broadcast, once the broadcast is complete it may not be possible for the television receiver to retrieve the television program from the content resource. Further, a television program may only be available from the content resource for a predefined amount of time (e.g., for up to a week following initial broadcast).

The illustrated example of embodiment 300 discloses the use of progress bars and a color of the progress bar to indicate the availability of a missed portion of the television program. It should be understood that an attribute of television program entries within an EPG besides color may be used to indicate availability of missed portions of television programs. For instance, a graphical element, such as an icon, may be presented in association with various television program entries in the EPG that indicate availability of the missed portion of the television program via one or more content resources.

Figure 4:
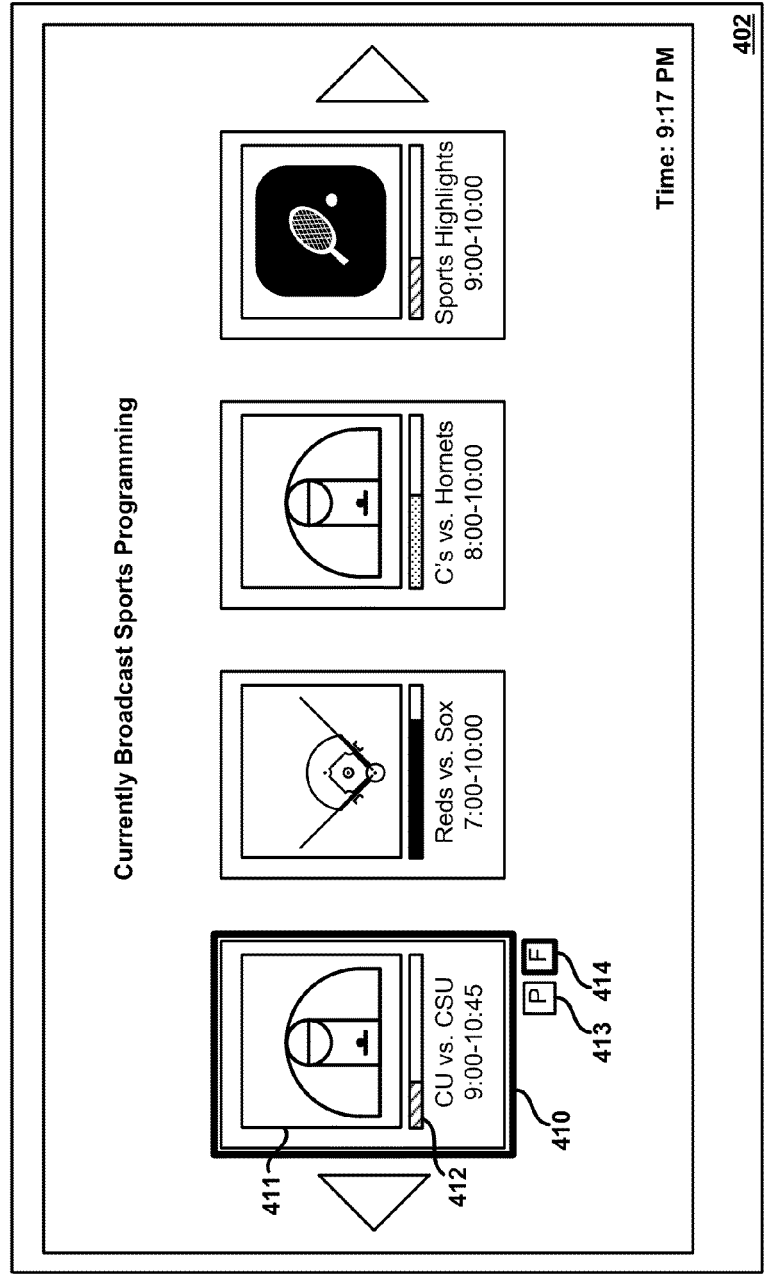
FIG. 4 illustrates another embodiment of an EPG that indicates missed television program content availability.

FIG. 4 illustrates an embodiment 400 of an EPG that indicates missed television program content availability. The EPG is presented by a display device 402, which may be a television. The EPG is output for display by a television receiver, such as television receiver 200 of FIG. 2 and television receiver 110 of FIG. 1. In embodiment 400, an EPG is being presented at 9:17 PM, possibly in response to a user request for the EPG. The EPG displays multiple television programs on multiple television channels, including television programs currently in-progress. The EPG may be presented as a tile-based display. In such a tile-based display, a graphical image may represent the television program. The graphical image may be a showcard or frame (e.g., MPEG I-frame) captured from the video feed of the television program. A showcard may be a graphical image intended to represent the television program, such as a cast photograph with the title of the television program. Other variations are possible. A tile display, such as presented in embodiment 400, may be used to display television programming currently being broadcast in a particular category. For example, embodiment 400 presents television programming currently directed to sports that is being broadcast.

In the illustrated embodiment 400, a college basketball game is selected, as indicated by highlighting 410. Showcard 411 represents the basketball game. Progress bar 412 is partially filled to indicate the amount of the basketball game which has already been broadcast. An attribute of the progress bar, such as its color, may indicate whether the portion of the basketball game which has already been broadcast may be retrieved from a content resource. In illustrated embodiment 400, the shading present in the filled portion of progress bar 412 indicates that the portion of the basketball game which has already been broadcast may be retrieved from a remote content resource. Icon 413 and icon 414 indicate the remote content resources from which the portion of the basketball game that has already been broadcast may be retrieved. As described in relation to television program 314, a user may be permitted to select which content resource is used to retrieve the portion of the television program which has already been broadcast. Further, the portion of the television program which has already been broadcast may be retrieved from the content resource selected based on the speed of response of the content resource or previously established priority ranking.

While in embodiment 400, the attribute of a progress bar, such as color, is used to indicate whether an already broadcast portion of a television program is available to be retrieved from a content resource, it should be understood that some other attribute of a television program's indication in the EPG may be used. For example, a background color for the entire entry of the television program in the EPG may indicate availability. Besides color, icons, shading, highlighting, or text may be other ways of indicating whether a television program can be retrieved from one or more content resources.

Figure 5:
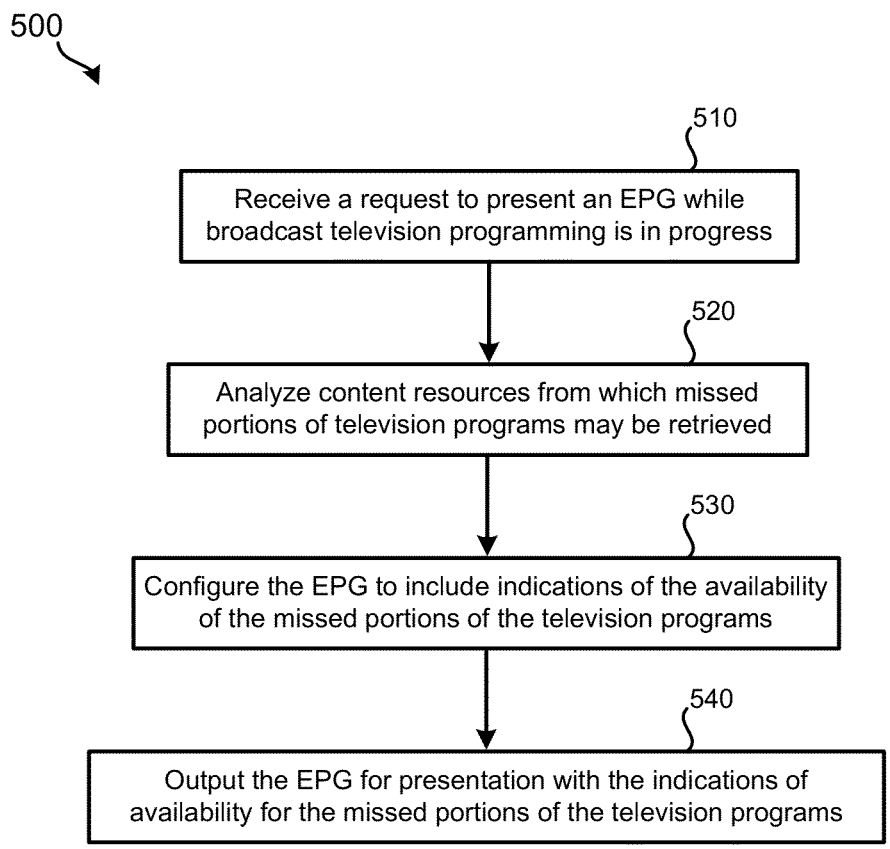
FIG. 5 illustrates an embodiment of a method for presenting an EPG that indicates missed television program content availability.

Various methods may be performed using the EPG interfaces and systems previously described. FIG. 5 illustrates an embodiment of a method 500 for presenting an EPG that indicates missed television program content availability. Method 500 may be performed using system 100 of FIG. 1 and/or the television receiver 200 of FIG. 2. It should be understood that method 500 may be performed using other forms of television provider systems (e.g., cable, IP-based) and other forms of television receivers. Each step of method 500 may be performed using a television receiver, which may include one or more instances of computerized components, such as presented in FIG. 7. As such, means for performing method 500 generally include television receivers. More specifically, means for performing method 500 include one or more instances of the components detailed in relation to FIG. 2 and FIG. 7.

At step 510, a request may be received to present an EPG via a display device, such as a television. This request to present the EPG may be from a user (e.g., via a remote control) or the request may originate from the television receiver. For example, the EPG may be displayed when the television receiver is powered on. When the EPG is displayed, at least some broadcast television programs are in progress; as such, a television service provider may be broadcasting the television programs to multiple television receivers via multiple television channels. At least some of the television programs have already elapsed. For example, at step 510, the television receiver may present the EPG at 8:05 PM while the broadcast television programs began being broadcast at 8:00 PM or earlier. As such, each of the television programs being broadcast has a missed portion (which may vary in length based on when the television program began broadcast).

At step 520, one or more content resources from which the missed portions of the television programs may be retrieved are analyzed. Step 520 may involve querying some or all of the available content resources to determine if the missed portion of one or more of the television programs is available. The content resources may involve a local storage medium of the television receiver, which may have recorded the missed portion of one or more of the television programs using DVR functionality of the television receiver. A database may be checked to determine if the missed portion of the television program was recorded. In some embodiments, a television service provider and a user are each able to configure the television receiver to record television programs. Therefore, a missed portion of a television program may be recorded even if the user has not specifically selected the television program for recording. Multiple other content resources may be available via a network connection, such as previously described public sources, the television service provider, catch-up services, subscription services, television receivers, and other computerized devices, such as illustrated in FIG. 1. Further, it may be determined if a staggered broadcast of the television program is available via the television service providers distribution network.

Some or all of these content resources may be contacted to determine the availability of missed portions of the television programs being broadcast. Alternatively, content resources may be queried in an order of priority. In such embodiments, once a content resource is determined to have the missed portion of the television program available for transmission to the television receiver, other content resources lower in priority may not be contacted regarding the missed portion of the television program. In some embodiments, a schedule may be fetched from one or more content resources that indicate which television programs will be available from the content resources in the future. As such, querying at the time of displaying the EPG may not be necessary. Rather, a schedule for a content resource stored by the television receiver may be consulted to determine if the missed portion of one or more television programs is available from the content resource.

At step 530, presentation of the EPG may be configured to include indications of the availability of the missed portions of television programs already being broadcast. The indications of availability may be integrated with a progress bar which indicates the amount of the television program which has already been broadcast and the amount of the television program yet to be broadcast (based upon a schedule previously received by the television receiver and stored in an EPG database, such as EPG database 230 of FIG. 2). The presentation of the EPG may be configured for output to a display device as similarly described in relation to FIGS. 3 and 4, or may be configured for output to a display device in some other manner. Various color schemes and graphical element schemes may be configured at step 530 in accordance with the embodiments described in relations to FIGS. 3 and 4.

Further, as content resources are queried and responses are received indicating the availability (or unavailability) of portions of television programs, the EPG may be further updated. For example, when first output to a display device for presentation, the EPG may indicate that a missed portion of a particular television program is not available. However, after a period of time, such as several seconds, presentation of the EPG may be updated to indicate that a content resource does have the missed portion of the television program available for retrieval. Further, the progress bars presented for television programs in progress may be continually or periodically updated while the EPG is being output for presentation. In some embodiments, in order to trigger querying of content resources, a user may be required to provide input to the television receiver via the EPG interface. For example, the user may provide input requesting the availability of a missed portion of a particular television program or of all television programs currently in progress.

At step 540, the EPG may be presented by outputting the EPG to a display device by the television receiver for presentation. The EPG may be presented as configured at step 530 and may be updated continually, periodically, or upon request from a user.

Figure 6:
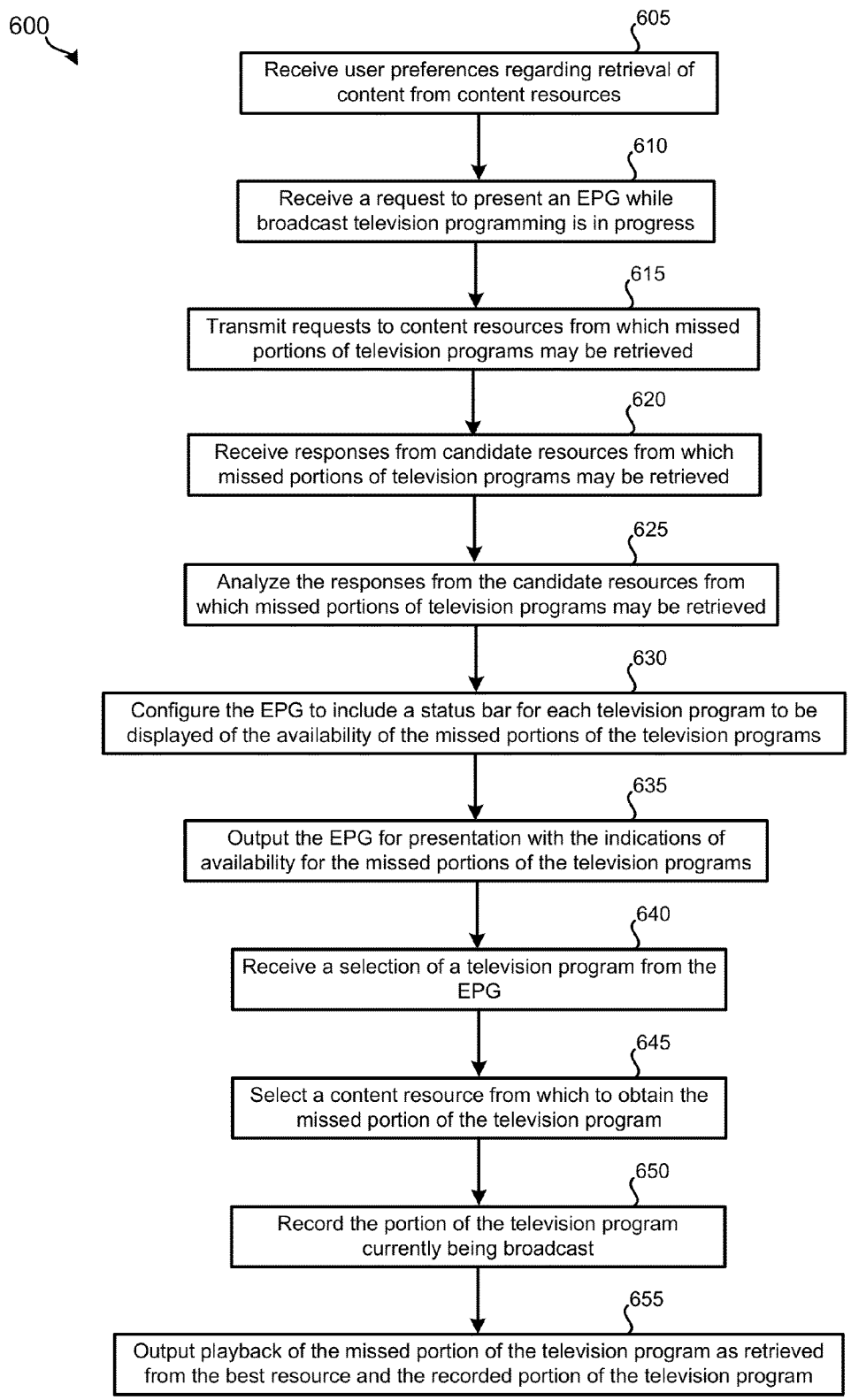
FIG. 6 illustrates an embodiment of a method for presenting missed television program content.

FIG. 6 illustrates an embodiment of a method 600 for presenting missed television program content. Method 600 may be performed using system 100 of FIG. 1 and/or the television receiver 200 of FIG. 2. It should be understood that method 600 may be performed using other forms of television provider systems (e.g., cable, IP-based) and other forms of television receivers. Each step of method 600 may be performed using a television receiver, which may include one or more instances of computerized components, such as presented in FIG. 7. As such, means for performing method 600 generally include television receivers. More specifically, means for performing method 600 include one or more instances of the components detailed in relation to FIG. 2 and FIG. 7. Method 600 may represent a more detailed example of method 500 of FIG. 5.

At step 605, a user may provide user preferences that govern retrieval of content from content resources. These user preferences may indicate which content resources should be used to attempt to receive missed portion of television programs, a priority order for obtaining television programming from content resources, and/or user credentials for content resources. These user preferences may be consulted by the television receiver when attempting to use a content resource to retrieve a missed portion of a television program.

At step 610, a request may be received to present an EPG via a display device, such as a television. When the EPG is displayed, at least some broadcast television programs are in progress; as such, a television service provider may be broadcasting the television programs to multiple television receivers via multiple television channels. At least some of the television programs have already elapsed. As such, each of the television programs being broadcast has a missed portion (which may vary in length based on when the television program began broadcast).

At step 615, requests may be transmitted to content resources to determine if the content resources have one or more missed portions of the television program available for retrieval. In some embodiments, rather than transmitting such a request after receiving a request to display the EPG, a schedule of available content may have been previously obtained from one or more content resources. At step 620, responses may be received from one or more content resources indicating the availability of the missed portion of the television program.

At step 625, responses from one or more content resources may be analyzed and/or schedules that indicate the availability of television programs from content resources may be analyzed. A content resource may be a local storage medium, which may have recorded the missed portion of one or more of the television programs using DVR functionality of the television receiver. A database may be checked to determine if the missed portion of the television program was recorded by the television receiver. Multiple other content resources may be available via a network connection, such as previously described public sources, the television service provider, catch-up services, subscription services, television receivers, and other computerized devices, such as illustrated in FIG. 1. Further, it may be determined if a staggered broadcast of the television program is available via the television service providers distribution network.

At step 630, presentation of the EPG may be configured to include indications of the availability of the missed portions of television programs already being broadcast. The indications of availability may be integrated with a progress bar which indicates the amount of the television program which has already been broadcast and the amount of the television program yet to be broadcast (based upon a schedule previously received by the television receiver and stored in an EPG database, such as EPG database 230 of FIG. 2. The presentation of the EPG may be configured for output to a display device as similarly described in relation to FIGS. 3 and 4, or may be configured for output to a display device in some other manner. Various color schemes and graphical element schemes may be configured at step 530 in accordance with the embodiments described in relations to FIGS. 3 and 4. At step 635, the EPG may be presented by outputting the EPG to a display device by the television receiver for presentation. The EPG may be presented as configured at step 630 and may be updated continually, periodically, or upon request from a user.

At step 640, a user may select a television program, such as via a remote control in communication with the television receiver. This television program, which is in progress of being broadcast, has a missed portion of the television program available for retrieval from a content resource. The selection received by the television receiver may trigger retrieval of the missed portion from a content resource determined to have the missed portion available.

At step 645, a content resource is selected from which the missed portion of the television program is to be retrieved. The selection may be based on a priority listing indicated by the user preferences defined at step 605. The selection may instead be based on a lowest response time and/or transfer rate from multiple content resources that have the missed portion available. The selection may be based on whichever content resource is first determined to have the missed portion of the television program available. In some embodiments, if multiple content resources have the missed portion of the television program available, the user may be prompted to select from which content resource to retrieve the missed portion.

At step 650, the remaining portion of the television program that is being broadcast and has not been missed may be recorded by the television receiver. As such, from the content resource (assuming the content resource is not a local storage medium), only the missed portion of the television program may be retrieved. The remaining portion of the television program may be recorded locally by the television receiver, thus limiting the amount of data that needs to be retrieved from the content resource. Accordingly, only the portion of the television program missed before step 650 may need to be retrieved from the content resource; the remainder may be recorded locally by the television receiver. Alternatively, in some embodiments, the entire television program is retrieved from the content resource. In some embodiments, if a portion of the television program is being transferred to the television receiver and the operating conditions deteriorate (e.g., the transfer rate is low, the latency is high, or the content resource stops responding), the television receiver may be configured to switch to retrieving the portion of the television program from another content resource that has the portion available for retrieval.

At step 655, the television program may be output for playback to the display device. The missed portion of the television program may be presented first, followed by a portion of the television program recorded locally by the television receiver. Playback between the portion of the television program retrieved from the content resource and the locally recorded portion may be seamless and may not require any user input to transition the playback.

Figure 7:
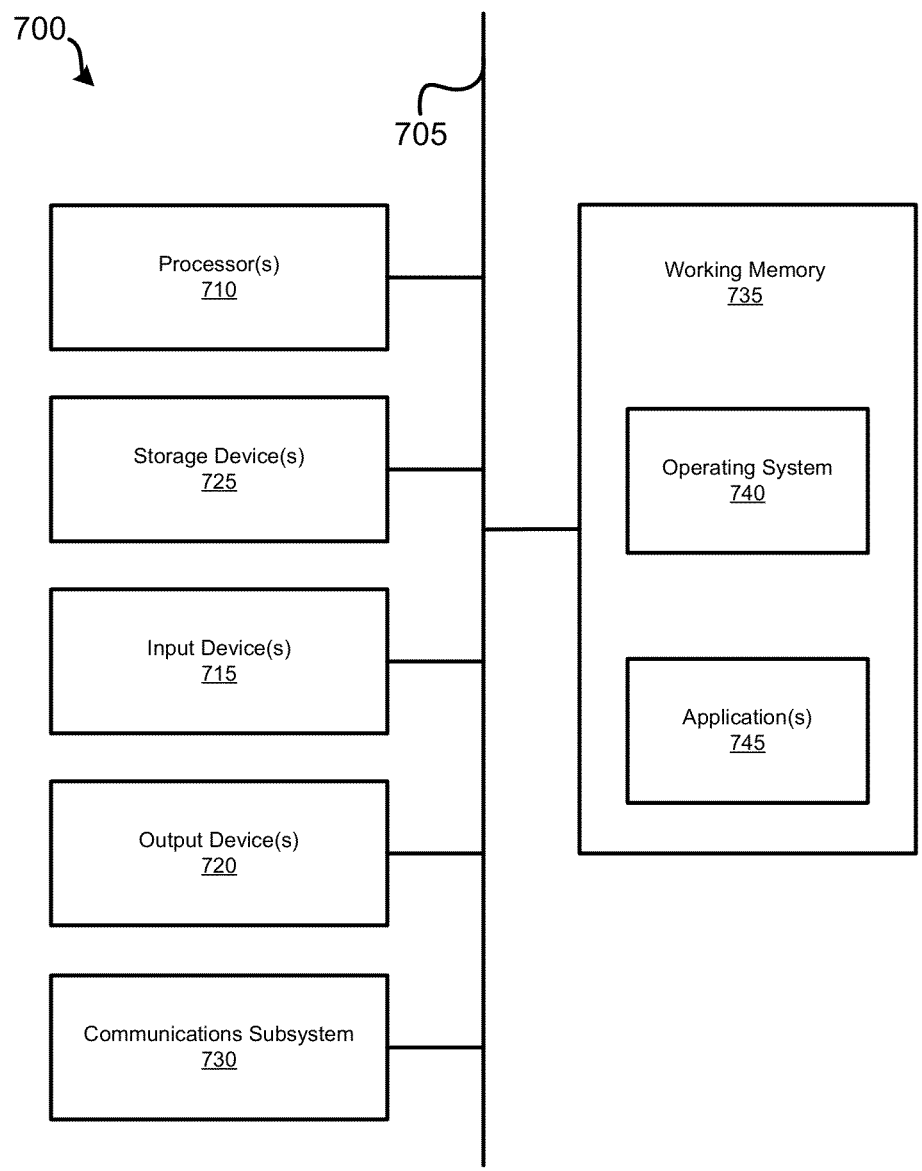
FIG. 7 illustrates an embodiment of a computer system.

FIG. 7 illustrates an embodiment of a computer system. A computer system as illustrated in FIG. 7 may be incorporated as part of the previously described computerized devices, such as the television receivers and content resources. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more applications 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as application 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A television receiver system for providing available playback options for missed portions of broadcast content, the television receiver system comprising:
   one or more processors; and
   a memory communicatively coupled with and readable by the one or more processors and having stored therein processor-readable instructions which, when executed by the one or more processors, cause the one or more processors to:
      process a received request to present an electronic programming guide that comprises indications of a plurality of television programs currently being broadcast, wherein
         when the received request to present the electronic programming guide is processed, a missed portion of one or more television programs of the plurality of television programs has already been broadcast;
      for each missed portion of the one or more television programs of the plurality of television programs, analyze a plurality of content resources from which the missed portion of each television program is potentially retrievable;
      for a television program of the one or more television programs, identify a first source from the plurality of content resources from which the missed portion of the television program is retrievable;
      configure the electronic programming guide to comprise an indication of availability of the missed portion of the television program, wherein the indication of availability comprises a progress bar that indicates a time within a total play time of the television program and a color of the progress bar indicates availability of the missed portion of the television program;
      select a state for the progress bar, wherein the state for the progress bar is based on the availability of the missed portion of the television program and the state is selected from at least three states, comprising:
         a first state associated with a first color, wherein the first state is indicative of the missed portion of the television program not being available;
         a second state associated with a second color, wherein the second state is indicative of the missed portion of the television program being locally stored by the television receiver system; and
         a third state associated with a third color, wherein the third state is indicative of the missed portion of the television program being remotely available to the television receiver system; and
      output the electronic programming guide for display such that the indication of availability of the missed portion of the television program is indicated.

2. The television receiver system for providing the available playback options for missed portions of broadcast content of claim 1, wherein the indication of availability of the missed portion of the television program comprises an icon that indicates the first source from the plurality of content resources.

3. The television receiver system for providing the available playback options for missed portions of broadcast content of claim 1, wherein the indication of availability of the missed portion of the television program comprises multiple icons, each icon indicative of a different source from the plurality of content resources through which the missed portion of the television program is available.

4. The television receiver system for providing the available playback options for missed portions of broadcast content of claim 1, wherein the processor-readable instructions which, when executed by the one or more processors, further cause the one or more processors to:
receive and store user credentials from a user of the television receiver system, wherein the user credentials are necessary to access the first source from the plurality of content resources; and
provide the user credentials to the first source.

5. The television receiver system for providing the available playback options for missed portions of broadcast content of claim 1, wherein the processor-readable instructions which, when executed by the one or more processors, cause the one or more processors to, for the television program of the plurality of television programs, identify the first source from the plurality of content resources from which the missed portion of the television program is retrievable, further cause the one or more processors to:
for the television program of the plurality of television programs, identify a second source from the plurality of content resources from which the missed portion of the television program is retrievable, wherein the first source and the second source are remote from the television receiver system.

6. The television receiver system for providing the available playback options for missed portions of broadcast content of claim 5, wherein the processor-readable instructions which, when executed by the one or more processors, further cause the one or more processors to:
process a selection of the television program, wherein the selection is based on user input;
determine, at least partially based on a faster response time, to select the first source instead of the second source to retrieve the missed portion of the television program; and
retrieve at least the missed portion of the television program from the first source.

7. The television receiver system for providing the available playback options for missed portions of broadcast content of claim 1, wherein each television program of the plurality of television programs is presented in the electronic programming guide with a showcard specific to the corresponding television program.

8. The television receiver system for providing the available playback options for missed portions of broadcast content of claim 1, wherein the television receiver system is a set top box.

9. A method for providing available playback options for missed portions of broadcast content, the method comprising:
receiving, by a television receiver, a request to present an electronic programming guide that comprises indications of a plurality of television programs currently being broadcast, wherein
when the received request to present the electronic programming guide is processed, a missed portion of one or more television programs of the plurality of television programs has already been broadcast;
for each missed portion of the one or more television programs of the plurality of television programs, analyzing, by the television receiver, a plurality of content resources from which the missed portion of the television program is potentially retrievable;
for a television program of the one or more television programs, identifying, by the television receiver, a first source from the plurality of content resources from which the missed portion of the television program is retrievable;
configuring, by the television receiver, the electronic programming guide to comprise an indication of availability of the missed portion of the television program, wherein the indication of availability comprises a progress bar that indicates a time within a total play time of the television program and a color of the progress bar indicates availability of the missed portion of the television program;
selecting, by the television receiver, a state for the progress bar, wherein the state for the progress bar is based on the availability of the missed portion of the television program and the state is selected from at least three states, comprising:
a first state associated with a first color, wherein the first state is indicative of the missed portion of the television program not being available;
a second state associated with a second color, wherein the second state is indicative of the missed portion of the television program being locally stored by the television receiver system; and
a third state associated with a third color, wherein the third state is indicative of the missed portion of the television program being remotely available to the television receiver system; and
outputting, by the television receiver, the electronic programming guide for display such that the indication of availability of the missed portion of the television program is indicated.

10. The method for providing the available playback options for missed portions of broadcast content of claim 9, wherein the indication of availability of the missed portion of the television program comprises an icon that indicates the first source from the plurality of content resources.

11. The method for providing the available playback options for missed portions of broadcast content of claim 9, wherein the indication of availability of the missed portion of the television program comprises multiple icons, each icon indicative of a different source from the plurality of content resources through which the missed portion of the television program is available.

12. The method for providing the available playback options for missed portions of broadcast content of claim 9, the method further comprising:
receiving and storing, by the television receiver, user credentials, wherein the user credentials are necessary to access the first source from the plurality of content resources; and
providing, by the television receiver, the user credentials to the first source.

13. The method for providing the available playback options for missed portions of broadcast content of claim 9, wherein identifying the first source from the plurality of content resources from which the missed portion of the television program is retrievable, further comprises:
identifying, by the television receiver, a second source from the plurality of content resources from which the missed portion of the television program is retrievable, wherein the first source and the second source are remote from the television receiver.

14. The method for providing the available playback options for missed portions of broadcast content of claim 13, further comprises:

processing, by the television receiver, a selection of the television program, wherein the selection is based on user input;

determining, by the television receiver, at least partially based on a faster response time, to select the first source instead of the second source to retrieve the missed portion of the television program; and retrieving, by the television receiver, at least the missed portion of the television program from the first source.

15. The method for providing the available playback options for missed portions of broadcast content of claim 9, wherein each television program of the plurality of television programs is presented in the electronic programming guide with a showcard specific to the corresponding television program.

16. A non-transitory processor-readable medium for providing available playback options for missed portions of broadcast content, comprising processor-readable instructions configured to cause one or more processors to:

process a received request to present an electronic programming guide that comprises indications of a plurality of television programs currently being broadcast, wherein
when the received request to present the electronic programming guide is processed, a missed portion for at least one of the plurality of television programs has already been broadcast;

for each of the missed portions of the plurality of television programs, analyze a plurality of content resources from which the missed portion of each television program of the plurality of television programs is potentially retrievable;

for a television program of the plurality of television programs, identify a first source from the plurality of content resources from which the missed portion of the television program is retrievable;

configure the electronic programming guide to comprise an indication of availability of the missed portion of the television program, wherein the indication of availability comprises a progress bar that indicates a time within a total play time of the television program and a color of the progress bar indicates availability of the missed portion of the television program;

select a state for the progress bar, wherein the state for the progress bar is based on the availability of the missed portion of the television program and the state is selected from at least three states, comprising:
a first state associated with a first color, wherein the first state is indicative of the missed portion of the television program not being available;
a second state associated with a second color, wherein the second state is indicative of the missed portion of the television program being locally stored by the television receiver system; and
a third state associated with a third color, wherein the third state is indicative of the missed portion of the television program being remotely available to the television receiver system; and output the electronic programming guide for display such that the indication of availability of the missed portion of the television program is indicated.

* * * * *